United States Patent
Agrawal et al.

(10) Patent No.: US 10,382,429 B2
(45) Date of Patent: *Aug. 13, 2019

(54) SYSTEMS AND METHODS FOR PERFORMING SECURE BACKUP OPERATIONS

(71) Applicant: Veritas Technologies LLC, Mountain View, CA (US)

(72) Inventors: Mukund Agrawal, Pune (IN); Gaurav Malhotra, Pune (IN); Vikas Kumar, Uttarakhand (IN); Nachiket Tanksale, Satara (IN)

(73) Assignee: Veritas Technologies LLC, Santa Clara, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/356,476

(22) Filed: Nov. 18, 2016

(65) Prior Publication Data

US 2018/0145969 A1     May 24, 2018

(51) Int. Cl.
*H04L 29/06*     (2006.01)
*G06F 11/14*     (2006.01)
(Continued)

(52) U.S. Cl.
CPC ...... *H04L 63/0823* (2013.01); *G06F 11/1464* (2013.01); *H04L 9/088* (2013.01); *H04L 9/3263* (2013.01); *H04L 63/105* (2013.01)

(58) Field of Classification Search
CPC ..... H04L 63/0823; H04L 9/30; H04L 9/3263; H04L 9/14; G06F 11/1464; G06F 2201/80
See application file for complete search history.

(56) References Cited

U.S. PATENT DOCUMENTS 9,130,837 B2 *   9/2015   Bjarnason ........... H04L 41/0809
9,396,209 B2 *   7/2016   Fukui ................ G06F 17/30377
(Continued)

OTHER PUBLICATIONS

Public-key cryptography; Wikipedia; accessed on Sep. 25, 2016; as published on the internet at https://en.wikipedia.org/wiki/Public-key_cryptography; Jan. 4, 2004.
(Continued)

*Primary Examiner* — Mohammad A Siddiqi
(74) *Attorney, Agent, or Firm* — FisherBroyles, LLP

(57) ABSTRACT

The disclosed computer-implemented method for performing secure backup operations may include (i) identifying a group of backup servers with heterogeneous computing environments that provide backup services for a backup client, (ii) determining, for each backup server within the group, a trust level of the backup server by identifying at least one security characteristic of the backup server, (iii) deploying, on each of the backup servers, a signed certificate that enables the backup server to transfer backup data with a security level that corresponds to the trust level of the backup server, and (iv) performing secure backup operations for the backup client by (a) identifying a sensitivity level of a backup task initiated by the backup client and (b) assigning the backup task to a backup server within the group of backup servers that has a signed certificate with a security level appropriate for the sensitivity level of the backup task.

18 Claims, 7 Drawing Sheets

(51) Int. Cl.
*H04L 9/14* (2006.01)
*H04L 9/30* (2006.01)
*H04L 9/32* (2006.01)
*H04L 9/08* (2006.01)

(56) References Cited

U.S. PATENT DOCUMENTS

| | | | | |
|---|---|---|---|---|
| 9,887,975 B1* | 2/2018 | Gifford | ............... | H04W 12/10 |
| 9,892,268 B2 | 2/2018 | Nguyen | | |
| 2006/0048228 A1 | 3/2006 | Takemori | | |
| 2007/0220319 A1* | 9/2007 | Desai | ................. | G06F 11/006 |
| | | | | 714/13 |
| 2009/0316907 A1* | 12/2009 | Cachin | ................. | H04L 9/083 |
| | | | | 380/278 |
| 2012/0078851 A1* | 3/2012 | Pinault | ............... | G06F 11/1448 |
| | | | | 707/652 |
| 2012/0284780 A1* | 11/2012 | Bergeson | ........... | H04L 63/0823 |
| | | | | 726/6 |
| 2013/0061035 A1* | 3/2013 | Hook | ..................... | H04L 9/088 |
| | | | | 713/150 |
| 2013/0326215 A1* | 12/2013 | Leggette | ............ | H04L 63/0823 |
| | | | | 713/156 |
| 2014/0006350 A1 | 1/2014 | Fukui | | |
| 2014/0137222 A1* | 5/2014 | Nguyen | ................... | G06F 8/60 |
| | | | | 726/7 |
| 2016/0125199 A1 | 5/2016 | Lee | | |
| 2016/0335628 A1* | 11/2016 | Weigold | ............... | G06Q 20/065 |
| 2017/0180394 A1* | 6/2017 | Crofton | ................ | H04L 63/145 |
| 2018/0145970 A1* | 5/2018 | Agrawal | ............ | H04L 63/0823 |

OTHER PUBLICATIONS

Public-key cryptography: Associating public keys with identities; Wikipedia; accessed on Sep. 25, 2016; as published on the internet at https://en.wikipedia.org/wiki/Public-key_cryptography; Jan. 4, 2004.

Public key certificate; Wikipedia; accessed on Sep. 25, 2016; as published on the internet at https://en.wikipedia.org/wiki/Public_key_certificate; Feb. 28, 2004.

Public key infrastructure; Wikipedia; accessed on Sep. 25, 2016; as published on the internet at https://en.wikipedia.org/wiki/Public_key_infrastructure; Jan. 4, 2004.

Certificate authority; Wikipedia; accessed on Sep. 25, 2016; as published on the internet at https://en.wikipedia.org/wiki/Certificate_authority; Apr. 2, 2004.

Truststore and Keystore Definitions; StackOverflow; accessed on Sep. 25, 2016; as published on the internet at http://stackoverflow.com/questions/318441/truststore-and-keystore-definitions; Dec. 5, 2008.

Is a self-signed SLL certificate much better than nothing?; StackExchange; accessed on Sep. 25, 2016; as published on the internet at http://security.stackexchange.com/questions/38727/is-a-self-signed-ssl-certificate-much-better-than-nothing; Sep. 25, 2013.

Building an Enterprise Root Certification Authority in Small and Medium Businesses; Microsoft; accessed on Sep. 25, 2016; as published on the internet at https://msdn.microsoft.com/en-us/library/cc875810.aspx; Jan. 15, 2015.

Active Directory Certificate Services; Microsoft; accessed on Sep. 25, 2016; as published on the internet at https://technet.microsoft.com/en-us/library/cc770357%28v=ws.10%29.aspx; Feb. 27, 2011.

How to Use X.509 Certificates and SSL for Secure Communications; Stephen McHenry; accessed on Sep. 25, 2016; as published on the Internet at https://sites.google.com/site/x509certificateusage/; Sep. 15, 2013.

Dynamic Host Configuration Protocol; Wikipedia; accessed on Oct. 10, 2016; as published on the internet at https://en.wikipedia.org/wiki/Dynamic_Host_Configuration_Protocol; Jul. 6, 2004.

CommVault; products and technology provided by CommVault found at www.commvault.com; Dec. 2, 1998.

Mukund Agrawal et al.; Systems and Methods for Performing Secure Backup Operations; U.S. Appl. No. 15/356,489, filed Nov. 18, 2016.

* cited by examiner

Table of Backup Host Trust Levels and Corresponding Backup Tasks
602

| TRUST LEVEL | CERTIFICATE TYPE | BACKUP TASKS |
|---|---|---|
| 0 | Deployed by administrator | Backup and restore restricted data |
| 1 | Deployed based on authorization token | Backup and restore unencrypted data |
| 2 | Deployed based on challenge-response protocol | Backup and restore encrypted data |
| 3 | Self-signed certificate | Backup and restore data for only specified client |

*FIG. 6*

SYSTEMS AND METHODS FOR PERFORMING SECURE BACKUP OPERATIONS

CROSS REFERENCE TO RELATED APPLICATION

This application incorporates by reference the entirety of U.S. application Ser. No. 15/356,489 by Mukund Agrawal, Gaurav Malhotra, Vikas Kumar, and Nachiket Tanksale, and titled Systems and Methods for Performing Secure Backup Operations, filed on 18 Nov. 2016.

BACKGROUND

Individuals and organizations that subscribe to backup services may wish to ensure that backup servers storing and restoring their data are able to adequately protect sensitive data from attackers. Likewise, backup services may wish to ensure that sensitive backup data is not restored to unverified clients. As such, large cloud-based or distributed backup services may configure backup servers (e.g., media servers) and client devices to establish secure, verified communication channels before data transfer begins. In particular, a backup service may facilitate secure data transfer by deploying certificates signed by trusted certificate authorities on the service's backup servers and/or on client devices that subscribe to the service.

Unfortunately, traditional systems for deploying signed certificates on backup servers and client devices may be slow and/or ineffective. For example, because backup servers and client devices may have varying computing environments, backup services may be unable to deploy certificates via a standard process or infrastructure. As such, deploying a signed certificate may require manual input or confirmation from one or more administrators within a backup service. Administrators managing vast numbers of backup servers or client devices may be unable to deploy certificates quickly enough to meet the demands of backup clients. As such, backup services may be unable to complete requested backup operations, or may be unable to provide backup clients with sufficient security during backup operations. The instant disclosure, therefore, identifies and addresses a need for systems and methods for performing secure backup operations.

SUMMARY

As will be described in greater detail below, the instant disclosure describes various systems and methods for performing secure backup operations. In one example, a method for performing secure backup operations may include (i) identifying a group of backup servers with heterogeneous computing environments that provide backup services for at least one backup client, (ii) determining, for each backup server within the group, a trust level of the backup server by identifying at least one security characteristic of the backup server, (iii) deploying, on each of the backup servers within the group, a signed certificate that enables the backup server to transfer backup data with a security level that corresponds to the trust level of the backup server, and (iv) performing secure backup operations for the backup client by (a) identifying a sensitivity level of a backup task to be performed and (b) assigning the backup task to a backup server within the group of backup servers that has a signed certificate with a security level appropriate for the sensitivity level of the backup task.

In some examples, identifying the security characteristic of the backup server may include identifying settings of a security infrastructure of the backup server. Additionally or alternatively, identifying the security characteristic of the backup server may include identifying a security characteristic of a network the backup server uses to transfer backup data and/or a security characteristic of a data storage system of the backup server.

In some embodiments, identifying the security characteristic of the backup server may include identifying an initial security characteristic that indicates the backup server meets an initial trust level that is appropriate for a sensitivity level of a type of backup task the backup server will likely perform. In such embodiments, deploying the signed certificate on the backup server may include deploying an initial signed certificate with a security level that corresponds to the initial trust level. Additionally in such embodiments, assigning the backup task to the backup server may include (i) determining that the security level of the initial signed certificate is not appropriate for the sensitivity level of the backup task assigned to the backup server, (ii) identifying an additional security characteristic of the backup server that indicates the backup server meets an additional trust level that is appropriate for the sensitivity level of the backup task (where the additional trust level is higher than the initial trust level) and then (iii) deploying an additional signed certificate on the backup server that has a security level corresponding to the additional trust level.

In some examples, deploying the signed certificate on the backup server may include storing, within the signed certificate, the security characteristic of the backup server. In these examples, the backup client may facilitate performing the secure backup operations by authenticating the backup server based on the security characteristic within the signed certificate.

In some examples, deploying the signed certificate on the backup server may include selecting, from within multiple types of signed certificates with various security levels, a type of signed certificate appropriate for the trust level of the backup server. In one embodiment, types of signed certificates with high security levels are appropriate for backup servers with high trust levels. Furthermore, in some examples, the multiple types of signed certificates may include (i) signed certificates manually deployed by an administrator of the group of backup servers, (ii) signed certificates deployed using an authorization token, (iii) signed certificates deployed using a challenge-response protocol, and/or (iv) self-signed certificates that are not signed by a certificate authority.

In some embodiments, identifying the sensitivity level of the backup task may include identifying a type of backup operation and/or a type of backup data involved in the backup task. Additionally or alternatively, identifying the sensitivity level of the backup task may include identifying a security characteristic of the backup client. In addition, in some examples, assigning the backup task to the backup server that has the signed certificate with the appropriate security level may include assigning backup tasks with high sensitivity levels to backup servers that have signed certificates with high security levels.

In some examples, the method may further include (i) determining a trust level of the backup client by identifying at least one security characteristic of the backup client and then (ii) deploying a signed certificate on the backup client that enables the backup client to facilitate backup operations with a security level that corresponds to the trust level of the backup client. In these examples, performing the secure backup operations for the backup client may include ensuring that the security level of the signed certificate deployed on the backup client is appropriate for the sensitivity level of the backup task.

In one embodiment, a system for performing secure backup operations may include several modules stored in memory, including (i) an identification module that identifies a group of backup servers with heterogeneous computing environments that provide backup services for at least one backup client, (ii) a determination module that determines, for each backup server within the group, a trust level of the backup server by identifying at least one security characteristic of the backup server, (iii) a deployment module that deploys, on each of the backup servers within the group, a signed certificate that enables the backup server to transfer backup data with a security level that corresponds to the trust level of the backup server, and (iv) a backup module that performs secure backup operations for the backup client by (a) identifying a sensitivity level of a backup task to be performed and (b) assigning the backup task to a backup server within the group of backup servers that has a signed certificate with a security level appropriate for the sensitivity level of the backup task. In addition, the system may include at least one physical processor configured to execute the identification module, the determination module, the deployment module, and the backup module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a group of backup servers with heterogeneous computing environments that provide backup services for at least one backup client, (ii) determine, for each backup server within the group, a trust level of the backup server by identifying at least one security characteristic of the backup server, (iii) deploy, on each of the backup servers within the group, a signed certificate that enables the backup server to transfer backup data with a security level that corresponds to the trust level of the backup server, and (iv) perform secure backup operations for the backup client by (a) identifying a sensitivity level of a backup task to be performed and (b) assigning the backup task to a backup server within the group of backup servers that has a signed certificate with a security level appropriate for the sensitivity level of the backup task.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 6 is a table of example backup host trust levels and corresponding backup tasks.

Figure 1:
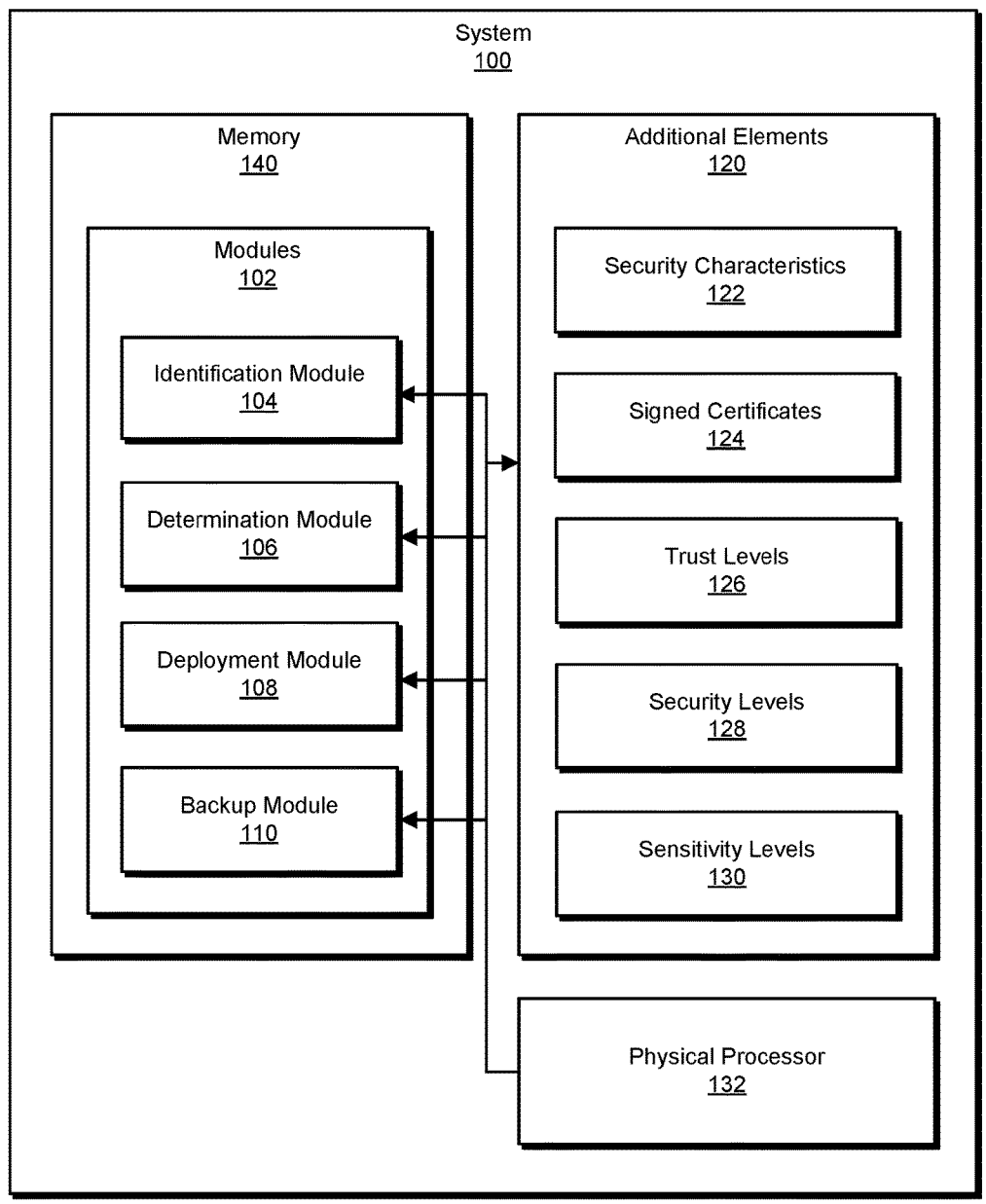
FIG. 1 is a block diagram of an example system for performing secure backup operations.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for performing secure backup operations. As will be explained in greater detail below, by determining a level of trustworthiness of backup servers managed by a backup service and/or backup clients that subscribe to the backup service, the disclosed systems and methods may deploy signed certificates on the devices that enable the devices to perform backup operations with security levels appropriate for each device. As such, the disclosed systems and methods may ensure that sensitive backup tasks are performed with sufficient levels of security, while reducing the need to deploy secure but labor-intensive signed certificates on backup servers and clients that do not handle sensitive backup data.

Moreover, the systems and methods described herein may improve the functioning and/or performance of a group of backup servers with heterogeneous computing environments by enabling the backup servers to securely perform backup tasks most suited for the security properties of the backup servers. These systems and methods may also improve the field of data backup and restoration by providing more efficient, flexible, and effective methods of selecting and deploying signed certificates on backup servers and backup clients.

Figure 2:
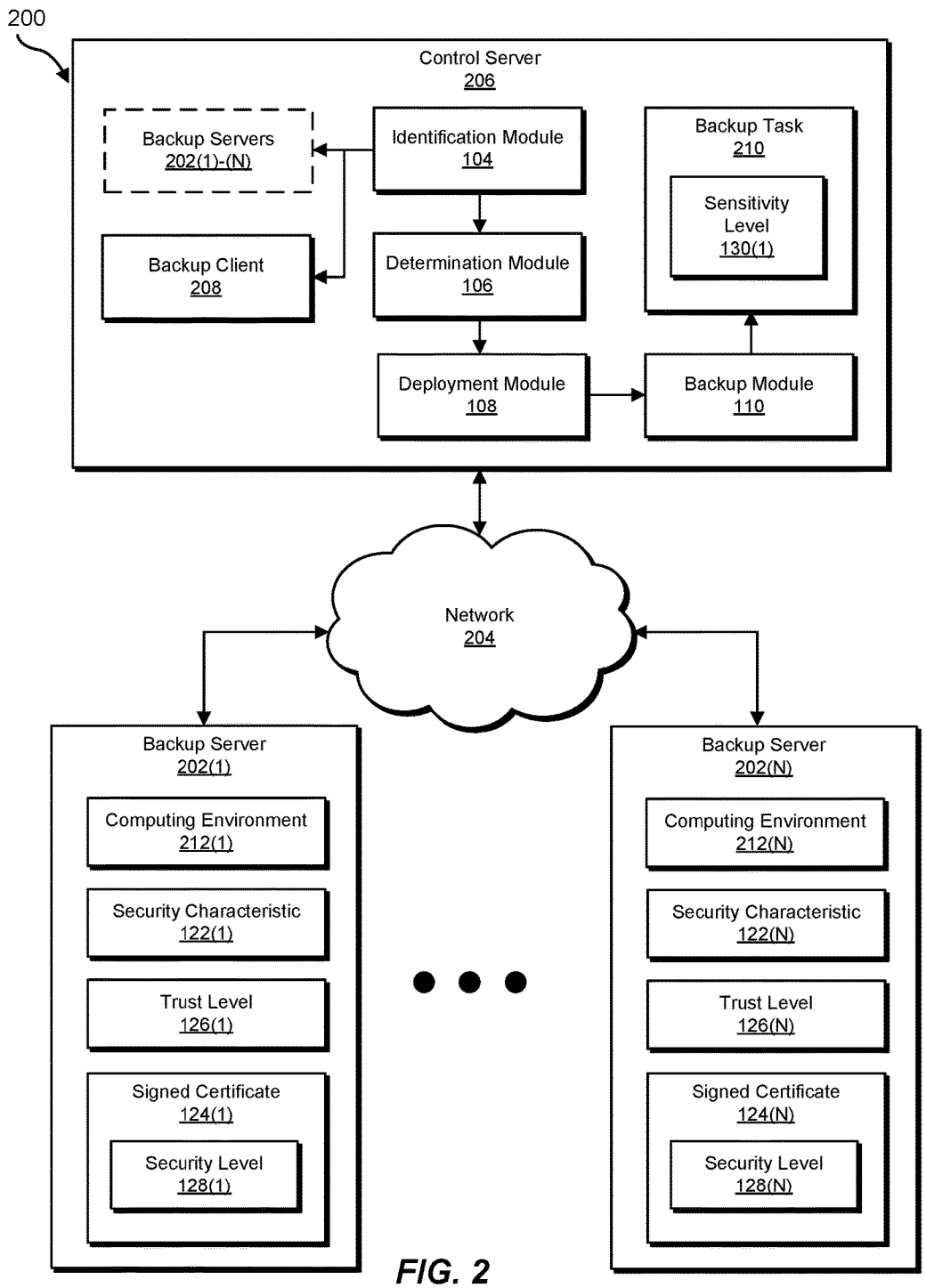
FIG. 2 is a block diagram of an additional example system for performing secure backup operations.

The following will provide, with reference to FIGS. 1 and 2, detailed descriptions of example systems for performing secure backup operations. Detailed descriptions of corresponding computer-implemented methods will also be provided in connection with FIGS. 3-5 and 7. In addition, detailed descriptions of example backup host trust levels and corresponding backup tasks will be provided in connection with FIG. 6.

FIG. 1 is a block diagram of an example system 100 for performing secure backup operations. As illustrated in this figure, example system 100 may include one or more modules 102 for performing one or more tasks. As will be explained in greater detail below, example system 100 may include an identification module 104 that identifies a group of backup servers with heterogeneous computing environments that provide backup services for at least one backup client. In addition, example system 100 may include a determination module 106 that determines, for each backup server within the group, a trust level of the backup server by identifying at least one security characteristic of the backup server.

In addition, and as will be explained in greater detail below, example system 100 may include a deployment module 108 that deploys, on each backup server within the group, a signed certificate that enables the backup server to transfer backup data with a security level that corresponds to the trust level of the backup server. Finally, example system 100 may include a backup module 110 that performs secure backup operations for the backup client by (i) identifying a sensitivity level of a backup task to be performed and (ii) assigning the backup task to a backup server within the group of backup servers that has a signed certificate with a security level appropriate for the sensitivity level of the backup task. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., backup servers 202(1)-(N) and/or control server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 132. Physical processor 132 generally represents any type or form of hardware-implemented processing unit capable of interpreting and/or executing computer-readable instructions. In one example, physical processor 132 may access and/or modify one or more of modules 102 stored in memory 140. Additionally or alternatively, physical processor 132 may execute one or more of modules 102 to facilitate performing secure backup operations. Examples of physical processor 132 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120. In one example, additional elements 120 may include security characteristics 122, which generally represent any type or form of property or feature indicating the hygiene and/or trustworthiness of one or more backup servers. In addition, additional elements 120 may include signed certificates 124, which generally represent any type or form of electronic credentials used to certify the identity of a backup server or backup client.

As illustrated in FIG. 1, additional elements 120 may additionally include trust levels 126. Trust levels 126 generally represent any quantification or assessment of the trustworthiness, hygiene, or security state of a backup server. In some embodiments, trust levels 126 may be based on one or more of security characteristics 122. As shown in FIG. 1, additional elements 120 may also include security levels 128. Security levels 128 generally refer to any indication of the degree to which one or more signed certificates (e.g., signed certificates 124) enable backup servers and backup clients to securely perform backup operations. In one example, security levels 128 may correspond to trust levels 126. Finally, as illustrated in FIG. 1, additional elements 120 may include sensitivity levels 130. Sensitivity levels 130 generally represent any quantification or assessment of the importance and/or confidentiality of a backup task or the data involved in a backup task.

Example system 100 in FIG. 1 may be implemented in a variety of ways. For example, all or a portion of example system 100 may represent portions of example system 200 in FIG. 2. As shown in FIG. 2, system 200 may include backup servers 202(1)-(N) in communication with a control server 206 via a network 204. In one example, all or a portion of the functionality of modules 102 may be performed by backup servers 202(1)-(N), control server 206, and/or any other suitable computing system. As will be described in greater detail below, one or more of modules 102 from FIG. 1 may, when executed by at least one processor of backup servers 202(1)-(N) and/or control server 206, enable control server 206 to perform secure backup operations.

For example, identification module 104 may cause control server 206 to identify backup servers 202(1)-(N) with heterogeneous computing environments 212(1)-(N) that provide backup services for a backup client 208. Next, determination module 106 may cause control server 206 to determine, for backup servers 202(1)-(N), trust levels 126(1)-(N) of backup servers 202(1)-(N) by identifying security characteristics 122(1)-(N) of backup servers 202(1)-(N). In addition, deployment module 108 may cause control server 206 to deploy, on backup servers 202(1)-(N), signed certificates 124(1)-(N) that enable backup servers 202(1)-(N) to transfer backup data with security levels 128(1)-(N) that correspond to trust levels 126(1)-(N). Finally, backup module 110 may cause control server 206 to perform secure backup operations for backup client 208 by (i) identifying a sensitivity level 130(1) of a backup task 210 and (ii) assigning backup task 210 to one of backup servers 206(1)-(N) that has a signed certificates with a security level appropriate for sensitivity level 130(1).

Backup servers 202(1)-(N) generally represent any type or form of computing device capable of reading computer-executable instructions. In some examples, backup servers 202(1)-(N) may represent media servers that run backup software configured to securely store and transfer backup data for one or more backup clients. Additional examples of backup servers 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Control server 206 generally represents any type or form of computing device that is capable of directing or managing backup servers. In some examples, control server 206 may represent a media server with administrative privileges that enable control server 206 to communicate with, deploy signed certificates on, and/or assign backup tasks to backup servers 202(1)-(N) and backup clients that subscribe to the backup service that manages control server 206. Additional examples of control server 206 include, without limitation, storage servers, database servers, application servers, and/or web servers configured to run certain software applications and/or provide various storage, database, and/or web services. Although illustrated as a single entity in FIG. 2, control server 206 may include and/or represent a plurality of servers that work and/or operate in conjunction with one another.

Network 204 generally represents any medium or architecture capable of facilitating communication or data transfer. In one example, network 204 may facilitate communication between backup servers 202(1)-(N) and control server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
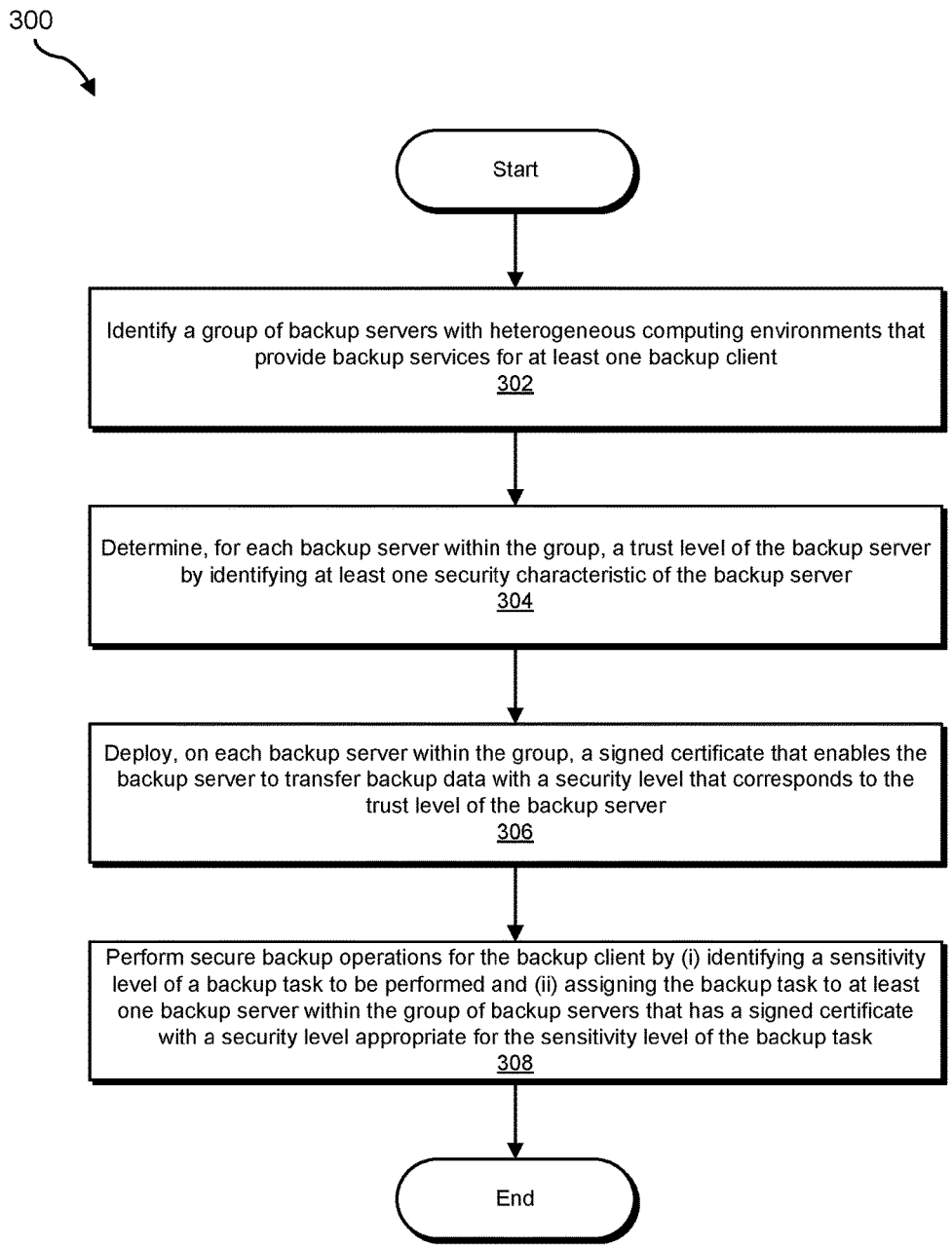
FIG. 3 is a flow diagram of an example method for performing secure backup operations.

FIG. 3 is a flow diagram of an example computer-implemented method 300 for performing secure backup operations. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify a group of backup servers with heterogeneous computing environments that provide backup services for at least one backup client. For example, identification module 104 may, as part of control server 206 in FIG. 2, identify backup servers 202(1)-(N) with heterogeneous computing environments 212(1)-(N) that provide backup services for backup client 208.

The term "computing environment," as used herein, generally refers to all or a portion of the software and/or hardware components of a computing device that may control or affect the computing device's operation or functionality. In one example, the computing environment of a backup server may include the backup server's operating system, applications running on the backup server, security settings of the backup server, an amount and/or type of data storage on the backup server, a network accessible by the backup server, and/or a physical location of the backup server.

The systems described herein may identify a group of backup servers with heterogeneous computing environments in a variety of ways. In some examples, identification module 104 may, while hosted on a control server that directs backup operations within a backup service, identify all or a portion of the backup servers managed by the backup service. In one embodiment, identification module 104 may identify each new backup server configured to perform backup operations for a backup service (e.g., each backup server that has not yet received a signed certificate).

In some embodiments, identification module 104 may identify characteristics of the computing environments of one or more backup servers. For example, identification module 104 may identify an operating system of each backup server, as well as any program or service (e.g., ACTIVE DIRECTORY) on the backup servers that enables fast deployment of signed certificates. In addition, identification module 104 may identify characteristics of one or more backup clients used by the backup servers. In some examples, identification module 104 may determine that a group of identified backup servers and/or backup clients have varying computing environments. For example, identification module 104 may determine that the identified devices have various operating systems, or determine that only a portion of the devices run programs such as ACTIVE DIRECTORY. As such, identification module 104 may determine that a backup service may be unable to implement a standard infrastructure or method to deploy signed certificates on the backup servers and backup clients.

Returning to FIG. 3, at step 304 one or more of the systems described herein may determine, for each backup server within the group of backup servers, a trust level of the backup server by identifying at least one security characteristic of the backup server. For example, determination module 106 may, as part of control server 206 in FIG. 2, determine trust levels 126(1)-(N) of backup servers 202(1)-(N) by identifying security characteristics 122(1)-(N).

The term "trust level," as used herein, generally refers to any quantification or assessment of the trustworthiness, hygiene, or security state of a computing device. In some examples, a trust level may represent an overall measure of the security characteristics of a computing device. In addition, a trust level may be represented as a number within any type or form of range or scale.

The term "security characteristic," as used herein, generally refers to any type of property or feature indicative of a computing device's ability to safely receive, store, handle, and/or transfer backup data (i.e., without the data being lost, corrupted, or accessed by an unauthorized entity). Examples of security characteristics of a backup server include, without limitation, characteristics of a network used by the backup server to transfer backup data (e.g., settings of a Domain Name Server (DNS) and/or Dynamic Server Configuration Protocol (DHCP) used by the backup server), characteristics of a data storage system of the backup server, settings of the security infrastructure of the backup server, and/or privileges granted to a user or administrator of the backup server.

The systems described herein may identify trust levels of a group of backup servers based on security characteristics of the backup servers in a variety of ways. In some embodiments, determination module 106 may identify multiple security characteristics of a backup server to determine the highest trust level that the backup server meets. For example, determination module 106 may perform a standard set of security tests on a backup server (based on identifying a standard set of security characteristics) and then calculate a trust level of the backup server based on the number and/or type of security tests successfully completed by the backup server. As specific examples, determination module 106 may assign a backup server a trust level of 4 (within a scale of 1-5, with 1 representing the highest trust level) in the event that the backup server uses a certain type of secure data storage system, and assign a backup server a trust level of 2 in the event that the backup server both implements the secure data storage system and uses a particular DNS known to be secure.

In other embodiments, determination module 106 may identify one or a limited number of security characteristics of a backup server to determine whether the backup server meets a particular trust level appropriate for backup tasks the backup server is likely to perform. For example, a backup service may designate one or more backup servers to handle particular types of backup data and/or perform backup tasks for particular clients. As a high level of security may generally not be necessary for these designated tasks or clients, determination module 106 may conserve time and computing resources by simply identifying a small number of security characteristics to determine whether the designated backup servers have a sufficient trust level for the backup tasks they will likely perform.

In some examples, determination module 106 may identify security characteristics of a backup server from a control server within a backup service that directs or manages the backup service's backup operations (e.g., as illustrated in FIG. 2). In other examples, determination module 106 may identify security characteristics of a backup server while operating directly on the backup server. Additionally or alternatively, all or a portion of determination module 106 may operate as part of or within a certificate authority server. As will be explained below, the systems described herein may work with (or as part of) certificate authorities to deploy signed certificates on backup servers based on security characteristics of the backup servers.

Furthermore, in some embodiments, determination module 106 may determine a trust level of one or more backup clients based on security characteristics of the backup clients. For example, in addition to calculating trust levels of a group of backup servers, determination module 106 may calculate trust levels of one or more backup clients that employ the backup servers to perform backup operations. Determination module 106 may calculate trust levels for backup clients using any one or more of the techniques described above in connection with backup servers.

Returning to FIG. 3, at step 306 one or more of the systems described herein may deploy, on each backup server within the group of backup servers, a signed certificate that enables the backup server to transfer backup data with a security level that corresponds to the trust level of the backup server. For example, deployment module 108 may, as part of control server 206 in FIG. 2, deploy signed certificates 124(1)-(N) that enable backup servers 202(1)-(N) to transfer backup data with security levels 128(1)-(N). In addition, deployment module 108 may deploy signed certificates on one or more backup clients that enable the backup clients to transfer backup data with a security level that corresponds to trust levels of the backup clients.

The term "signed certificate," as used herein, generally refers to any type or form of electronic credential used to assert the identity of a user or device. In some examples, a signed certificate may assert the identity of a device by encrypting a signature associated with the device with a private encryption key (e.g., an encryption key known only to the device or a trusted third party). Another device that wishes to verify the identity of the device providing the certificate may decrypt the signature using a public encryption key that corresponds to the private encryption key. After the verification is complete, a secure, encrypted communication channel may be established between the two devices.

In some embodiments, a user or device that wishes to generate a trusted certificate may enlist a certificate authority to sign the certificate. As used herein, the term "certificate authority" generally refers to any trusted party that verifies the identity of a user or device requesting a signed certificate and then signs the certificate on behalf of the user or device. Another device verifying the certificate may determine that the device providing the certificate is trusted based on determining that the certificate was signed by the certificate authority. In other embodiments, a certificate may simply be signed by the entity whose identity the certificate is asserting (i.e., creating a self-signed certificate). While a self-signed certificate may not necessarily be malicious, a device attempting to verify the self-signed certificate may be unable to determine whether the certificate should be trusted.

Deployment module 108 may deploy signed certificates on backup hosts using a variety of security or authentication protocols. The term "backup host," as used herein, generally refers to any device running backup software (i.e., either a backup client or a backup server). In some examples, the process used to deploy a signed certificate on a backup host may define or represent the security level of the signed certificate. The term "security level," as used herein, generally refers to any indication or quantification of the ability of a signed certificate to facilitate a backup host in safely transmitting and/or handling backup data.

In general, deployment processes that result in highly secure signed certificates may involve greater time and/or resources from backup services, backup clients, and/or certificate authority servers (as well as administrators of these devices) compared to deployment processes that result in less secure certificates. As such, the disclosed systems may deploy signed certificates on a group of backup servers and/or backup clients using a variety of deployment processes to minimize the burden and/or overhead of deployment while still ensuring that sensitive backup tasks are handled with appropriate security levels.

In one embodiment, deployment module 108 may deploy signed certificates on backup hosts by facilitating a deployment process that involves manual input from one or more administrators of a backup host and/or certificate authority. In general, such a manual deployment process may generate highly secure certificates, but may be slower and more tedious than other deployment processes.

Figure 4:
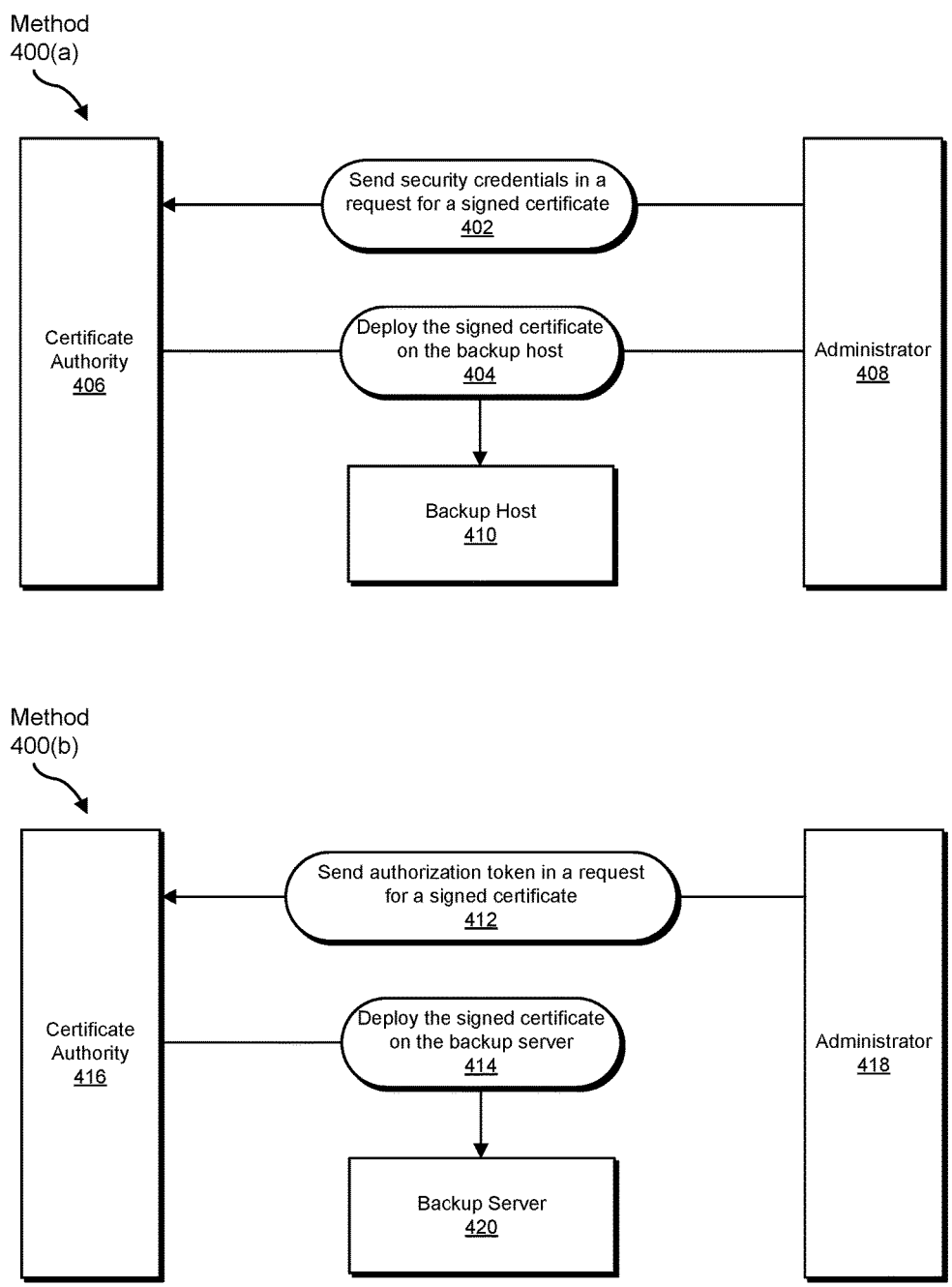
FIG. 4 is a block diagram of additional example methods for deploying signed certificates on backup hosts.

Method 400(*a*) in FIG. 4 illustrates an example of a manual deployment process. In particular, method 400(*a*) describes steps that may be performed by a certificate authority 406 and an administrator 408 while deploying a signed certificate on a backup host 410. At step 402 of method 400(*a*), administrator 408 may receive or configure security credentials used to generate a signed certificate (e.g., a public or private key associated with backup host 410). Administrator 408 may then send the security credentials to certificate authority 406 with a request to generate a signed certificate for backup host 410. At step 404, certificate authority 406 and/or administrator 408 may deploy the signed certificate on backup host 410. For example, certificate authority 406 may generate the certificate and then administrator 408 may manually copy the certificate onto backup host 410.

In other embodiments, deployment module 108 may deploy signed certificates on backup hosts using an authorization token. In general, deployment processes involving authorization tokens may generate certificates that are less secure than the certificates deployed via the manual deployment process described above. However, these deployment processes may be faster and/or require less input from administrators than a manual process.

Method 400(*b*) in FIG. 4 illustrates an example of a deployment process involving an authorization token. In particular, method 400(*b*) shows steps that may be performed by a certificate authority 416 and an administrator 418 while deploying a signed certificate on a backup host 420. At step 412 in method 400(*b*), administrator 418 may send, along with a request to generate a signed certificate for backup host 420, an authorization token that verifies the identity of backup host 420 to certificate authority 416. In one example, the authorization token may have been configured and/or provided to administrator 418 from an administrator of certificate authority 416. At step 414, certificate authority 416 may generate a signed certificate based on receiving the authorization token and then deploy the signed certificate on backup host 420 (e.g., without requiring input from administrator 418).

In a further embodiment, deployment module 108 may deploy signed certificates on backup hosts based on identifying or verifying security characteristics of the backup servers. In general, deployment processes involving security verifications may be less secure than either the manual deployment processes or token-based processes described above, but may also be more efficient (e.g., these processes may not require any manual input from an administrator).

Figure 5:
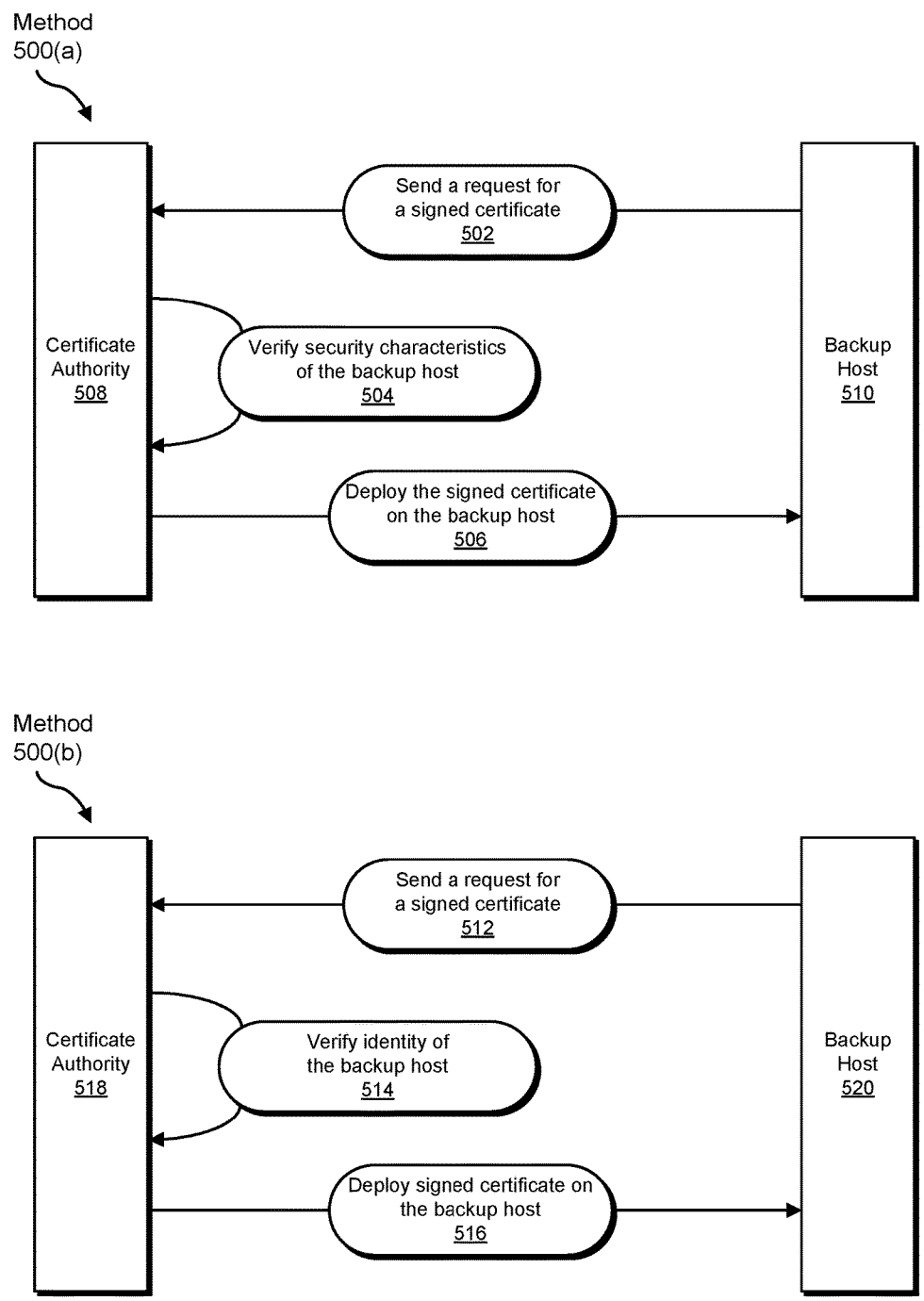
FIG. 5 is a block diagram of additional example methods for deploying signed certificates on backup hosts.

Method 500(*a*) in FIG. 5 illustrates an example of a deployment process involving a security verification. In particular, method 500(*a*) shows steps that may be performed by a certificate authority 508 and a backup host 510 while deploying a signed certificate on backup host 510. At step 502 in method 500(*a*), backup host 510 may send a request to certificate authority 508 to receive a signed certificate. At step 504, certificate authority 508 may verify one or more security characteristics of backup host 510 to determine whether backup host 510 is authorized to receive a signed certificate. For example, certificate authority 508 may perform one or more of the security tests described above in connection with step 304, or certificate authority 508 may identify the results of a previously-performed security test. At step 506, after verifying the security characteristics of backup host 510, certificate authority 508 may deploy a signed certificate on backup host 510.

In another embodiment, deployment module 108 may deploy signed certificates on backup hosts based on simply verifying the identity of the backup hosts. In general, deployment processes involving identity verifications may be less secure (but more efficient) than the other processes described above.

Method 500(*b*) in FIG. 5 illustrates an example of a deployment process involving identity verification. In particular, method 500(*b*) shows steps that may be performed by a certificate authority 518 and a backup host 520 while deploying a signed certificate on backup host 520. At step 512 in method 500(*b*), backup host 520 may send a request to certificate authority 518 to receive a signed certificate. At step 514, certificate authority 518 may verify the identity of backup host 520 (e.g., based on information within the request sent by backup server 520). At step 516, after verifying the identity of backup host 520, certificate authority 518 may deploy a signed certificate on backup host 520.

Deployment module 108 may deploy signed certificates on backup clients or backup servers using any additional or alternative deployment process not illustrated in FIGS. 4 and 5. For example, deployment module 108 may deploy signed certificates using multi-use authorization tokens capable of authenticating multiple backup servers or by using challenge-response protocols. Furthermore, in some embodiments, deployment module 108 may deploy self-signed certificates on backup hosts, thereby avoiding the time and computing resources required for a certificate authority to sign certificates.

The systems described herein may deploy signed certificates that enable backup hosts to transfer backup data with appropriate security levels in a variety of ways. In general, deployment module 108 may determine that signed certificates deployed via processes that result in high security levels (such as certificates manually deployed by administrators) are appropriate for highly trusted backup hosts, while signed certificates with low security levels (such as certificates deployed without verification processes) are appropriate for untrusted backup hosts.

As an example of assigning types of signed certificates to backup host trust levels, FIG. 6 illustrates a table of backup host trust levels and corresponding backup tasks 602. In this example, table 602 may map trust levels of backup hosts to appropriate certificate types. As shown in FIG. 4, table 602 may illustrate four trust levels (i.e., trust levels 0-3, with trust level 0 representing the highest trust level). In this example, deployment module 108 may determine that certificates signed by a certificate authority and deployed with input from an administrator are most appropriate for backup hosts with trust level 0, certificates deployed based on an authorization token are most appropriate for backup hosts with trust level 1, certificates deployed based on a challenge-response protocol are most appropriate for backup hosts with trust level 2, and self-signed certificates are most appropriate for backup hosts with trust level 3.

After determining a type of signed certificate most appropriate for a backup host based on the trust level of the backup server, deployment module 108 may facilitate the process of deploying the signed certificate (e.g., via the processes described above in connection with FIGS. 4 and 5). For example, deployment module 108 may configure appropriate security protocols involved in the certificate's deployment process, as well as implement the deployment process based on the computing environment of the backup host (e.g., determined by identification module 104 in step 302). In some examples, deployment module 108 may deploy (or facilitate deploying, in the event that administrator input is required) a signed certificate on a backup host while the backup server is being configured with backup software that initializes the backup host and/or enables the backup host to perform backup operations.

Additionally, in some embodiments, deployment module 108 may store one or more security characteristics of a backup host within the signed certificate deployed on the backup host. In particular, deployment module 108 may store this information within a user-defined extension or field within the certificate. In this way, a backup client may efficiently identify a backup server's trust level before the backup server performs a backup task for the backup client (rather than performing a more resource-intensive authentication process based on information provided by a certificate authority or external database). Furthermore, the security characteristics of one or more backup hosts may be stored in additional locations for user and administrator reference, such as in control servers and/or audit logs within a backup service.

Returning to FIG. 3, at step 308 one or more of the systems described herein may perform secure backup operations for the backup client by (i) identifying a sensitivity level of a backup task to be performed and (iii) assigning the backup task to a backup server within the group of backup servers that has a signed certificate with a security level appropriate for the sensitivity level of the backup task. For example, backup module 110 may, as part of control server 206 in FIG. 2, perform secure backup operations for backup client 208 by (i) identifying a sensitivity level 130(1) of a backup task 210 and (ii) assigning backup task 210 to one of backup servers 206(1)-(N) that has a signed certificates with a security level appropriate for sensitivity level 130(1).

The term "backup task," as used herein, generally refers to any type or form of project, job, or operation involving receiving, transmitting, storing, handling, and/or restoring backup data (or metadata describing backup data). In some examples, a backup task may involve data transfer between a backup client and a backup server. In other examples, a backup task may involve backup data or metadata manipulation on backup servers (e.g., identifying backup images, deleting backup data, and updating backup policies or software). In addition, backup tasks may have a variety of sensitivity levels. The term "sensitivity level," as used herein, generally refers to any indication or quantification of the importance and/or desired confidentiality of a backup task or the backup data involved in the backup task.

The systems described herein may identify a sensitivity level of a backup task in a variety of ways. In some examples, backup module 110 may determine a sensitivity level of a backup task based on a type of data involved in the backup task. For example, backup module 110 may determine that a backup task involving data that a backup client has identified as classified or critical is more sensitive than a backup task involving unclassified or non-critical data. In another example, backup module 110 may determine that a backup task involving unencrypted data is more sensitive than a backup task involving encrypted data, as unencrypted data may represent a greater security risk to a backup client if accessed by unauthorized parties.

Additionally or alternatively, backup module 110 may determine a sensitivity level of a backup task based on a type of backup operation involved in the backup task. For example, backup module 110 may determine that backup tasks involving restoring data to a backup client are more sensitive than backup tasks that involve only receiving and storing data for a backup client. Furthermore, backup module 110 may determine a sensitivity level of a backup task based on security characteristics or properties of a backup client that initiated the backup task. For example, backup module 110 may assign high sensitivity levels to backup tasks initiated by clients known to handle private or restricted information (such as financial information or government projects).

After identifying a sensitivity level of a backup task, backup module 110 may assign or designate the backup task to be performed by a backup server that has an appropriate trust level (e.g., a backup server that has a signed certificate with an appropriate security level). In general, backup module 110 may assign backup tasks with low sensitivity levels to backup servers that have signed certificates with low security levels, and assign highly sensitive backup tasks to backup servers that have highly secure signed certificates.

As specific examples, table 602 in FIG. 6 illustrates backup tasks that backup module 110 may determine are appropriate for backup hosts with various trust levels and certificate types. Specifically, table 602 may illustrate that only backup servers with trust levels of 0 (i.e., servers with signed certificates manually deployed by an administrator) are permitted to perform backup tasks involving restricted data. In addition, table 602 may illustrate that backup servers with trust levels of 1 are permitted to perform backup tasks involving unencrypted data, while backup data must be encrypted to be handled by backup servers with a trust level of 2. Finally, table 602 may illustrate that backup servers with trust levels of 3 (i.e., servers with self-signed certificates) are only allowed to perform backup tasks for a specified client (e.g., a client known to handle non-sensitive data).

In some examples, backup module 110 may determine that a backup server does not have a signed certificate with a security level appropriate for a backup task assigned to the backup server. For example, as described above, a backup service may delegate a backup server to perform backup tasks for a particular backup client. In addition, deployment module 108 may have deployed a signed certificate on the delegated backup server that is appropriate for backup tasks that the backup client will likely request. As such, in the event that the backup client requests a backup task with an unexpectedly high sensitivity level, the delegated backup server may be unable to perform the backup task with an appropriate level of security.

Accordingly, the systems described herein may replace the signed certificate on the backup server with an additional signed certificate to enable the backup server to securely perform the sensitive backup task. For example, determination module 106 may identify one or more additional security characteristics of the backup server to ensure that the backup server meets a higher trust level that is appropriate for the sensitive backup task. Deployment module 108 may then deploy an additional signed certificate on the backup server that has a security level appropriate for the sensitivity level of the backup task. As such, the disclosed systems may ensure that sensitive backup tasks are only performed by backup servers capable of providing a sufficient level of security.

Furthermore, in some embodiments, backup module 110 may ensure that a backup client is able to facilitate a backup task with a sufficient level of security. For example, backup module 110 may determine whether a backup client involved in a backup task has a trust level appropriate for a sensitivity level of the backup task (or a signed certificate with an appropriate security level) before permitting backup data to be transferred to or from the backup client.

Figure 7:
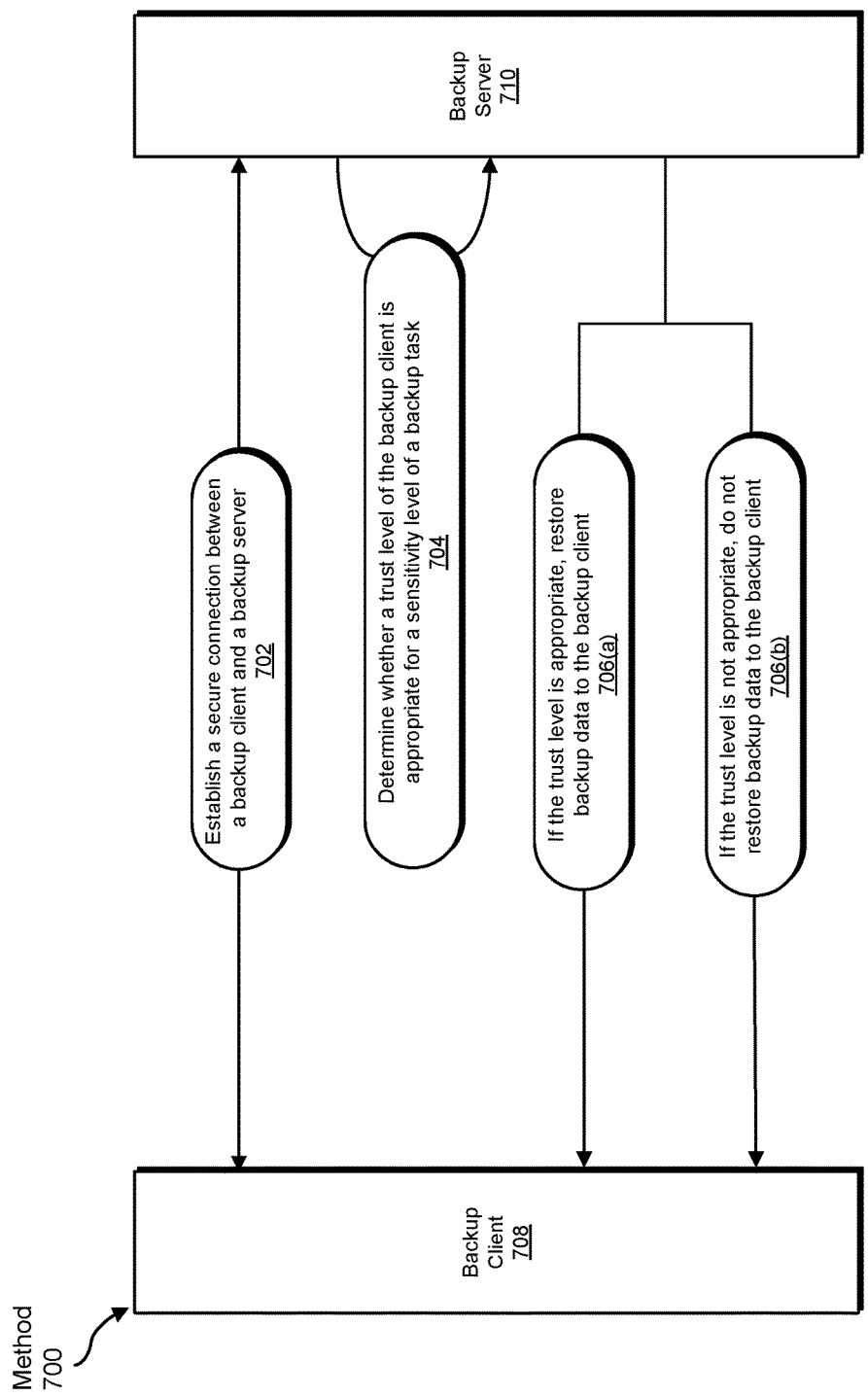
FIG. 7 is a block diagram of an additional example method for performing secure backup operations.

Method 700 in FIG. 7 illustrates an example process of facilitating a backup task for a backup client based on a trust level of the backup client. In particular, method 700 illustrates steps performed by a backup server 710 while performing a backup task that involves restoring data to a backup client 708. At step 702 in method 700, backup server 710 may establish a secure connection with backup client 708. For example, backup server 710 and backup client 708 may identify and/or verify each other based on information within signed certificates deployed on both devices. At step 704, backup server 710 may determine whether a trust level of backup client 708 is appropriate for a sensitivity level of the backup task. For example, backup server 710 may analyze security information included within the signed certificate on backup client 708 to identify the security level of the certificate and/or the trust level of backup client 708. In the event that backup server 710 determines that the trust level of backup client 708 is appropriate, backup server 710 may perform step 706(a), which involves restoring backup data to backup client 708. However, in the event that backup server 710 determines that the trust level of backup client 708 is not appropriate, backup server 710 may perform step 706(b), which involves backup server 710 aborting the backup task or otherwise declining to restore backup data to backup client 708.

As explained above in connection with FIGS. 1-7, a backup service (such as NETBACKUP) may deploy signed certificates on backup servers that enable the backup servers to perform backup operations with security levels appropriate for the trust levels of the backup servers. For example, a NETBACKUP control server may designate highly trusted backup servers to receive signed certificates manually deployed by administrators to enable the backup servers to perform highly sensitive backup tasks, while deploying less-secure certificates via more automatic processes on backup servers that are not required to performed such sensitive backup tasks. In this way, the NETBACKUP control server may ensure that sensitive backup tasks are performed with an appropriate level of security, while avoiding excess time and computing resources spent deploying certificates with labor-intensive deployment processes on backup servers that handle less sensitive tasks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for performing secure backup operations, at least a portion of the method being performed by a computing device comprising at least one processor, the method comprising:
   identifying a plurality of backup servers with heterogeneous computing environments that provide backup services for at least one backup client;
   determining, for each of the plurality of backup servers, a trust level of the backup server by identifying at least one security characteristic of the backup server;
   for each of the plurality of backup servers, selecting, within a plurality of types of signed certificates that provide various security levels for transferring backup data, an appropriate type of signed certificate for the backup server, wherein:
      types of signed certificates that provide high security levels for transferring backup data are appropriate for backup servers with high trust levels; and
      types of signed certificates that provide low security levels for transferring backup data are appropriate for backup servers with low trust levels;
   deploying, on each of the plurality of backup servers, a signed certificate of the appropriate type selected for the backup server such that the backup server is capable of transferring backup data with a security level that corresponds to the trust level of the backup server; and
   performing secure backup operations for the backup client by:
      identifying a backup task to be performed;
      identifying a sensitivity level of the backup task based at least in part on a type of data involved in the backup task; and
      assigning the backup task to at least one backup server within the plurality of backup servers that has a signed certificate that facilitates transferring backup data with a security level appropriate for the sensitivity level of the backup task.

2. The method of claim 1, wherein identifying the security characteristic of the backup server comprises identifying a security characteristic of at least one of:
   a network the backup server uses to transfer backup data;
   a data storage system of the backup server; and
   settings of a security infrastructure of the backup server.

3. The method of claim 1, wherein:
   identifying the security characteristic of the backup server comprises identifying an initial security characteristic that indicates the backup server meets an initial trust level that is appropriate for a sensitivity level of a type of backup task the backup server will likely perform; and
   deploying the signed certificate on the backup server comprises deploying an initial signed certificate that facilitates transferring backup data with a security level that corresponds to the initial trust level.

4. The method of claim 3, wherein assigning the backup task to the backup server further comprises:
   determining that the security level with which the initial signed certificate facilitates transferring backup data is not appropriate for the sensitivity level of the backup task assigned to the backup server;
   identifying an additional security characteristic of the backup server that indicates the backup server meets an additional trust level that is appropriate for the sensitivity level of the backup task, the additional trust level being higher than the initial trust level; and
   deploying an additional signed certificate on the backup server that facilitates transferring backup data with a security level corresponding to the additional trust level.

5. The method of claim 1, wherein:
   deploying the signed certificate on the backup server further comprises storing, within the signed certificate, the security characteristic of the backup server; and
   performing the secure backup operations for the backup client further comprises authenticating, by the backup client, the backup server based on the security characteristic within the signed certificate.

6. The method of claim 1, wherein the plurality of types of signed certificates comprises at least one of:
   signed certificates manually deployed by an administrator of the plurality of backup servers;
   signed certificates deployed using an authorization token;
   signed certificates deployed using a challenge-response protocol; and
   self-signed certificates that are not signed by a certificate authority.

7. The method of claim 1, wherein identifying the sensitivity level of the backup task further comprises identifying at least one of:
   a type of backup operation involved in the backup task;
   a desired level of confidentiality of data involved in the backup task; and
   a security characteristic of the backup client.

8. The method of claim 1, wherein assigning the backup task to the backup server that has the signed certificate that facilitates transferring backup data with the appropriate security level comprises assigning backup tasks with high sensitivity levels to backup servers that have signed certificates that facilitate transferring backup data with high security levels.

9. The method of claim 1, further comprising:
   determining a trust level of the backup client by identifying at least one security characteristic of the backup client; and
   deploying a signed certificate on the backup client that enables the backup client to facilitate backup operations with a security level that corresponds to the trust level of the backup client.

10. The method of claim 9, wherein performing the secure backup operations for the backup client further comprises ensuring that the security level of the signed certificate deployed on the backup client is appropriate for the sensitivity level of the backup task.

11. A system for performing secure backup operations, the system comprising:
an identification module, stored in memory, that identifies a plurality of backup servers with heterogeneous computing environments that provide backup services for at least one backup client;
a determination module, stored in memory, that determines, for each of the plurality of backup servers, a trust level of the backup server by identifying at least one security characteristic of the backup server;
a deployment module, stored in memory, that:
for each of the plurality of backup servers, selects, within a plurality of types of signed certificates that provide various security levels for transferring backup data, an appropriate type of signed certificate for the backup server, wherein:
types of signed certificates that provide high security levels for transferring backup data are appropriate for backup servers with high trust levels; and
types of signed certificates that provide low security levels for transferring backup data are appropriate for backup servers with low trust levels; and
deploys, on each of the plurality of backup servers, a signed certificate of the appropriate type selected for the backup server such that the backup server is capable of transferring backup data with a security level that corresponds to the trust level of the backup server;
a backup module, stored in memory, that performs secure backup operations for the backup client by:
identifying a backup task to be performed;
identifying a sensitivity level of the backup task based at least in part on a type of data involved in the backup task; and
assigning the backup task to at least one backup server within the plurality of backup servers that has a signed certificate that facilitates transferring backup data with a security level appropriate for the sensitivity level of the backup task; and
at least one physical processor configured to execute the identification module, the determination module, the deployment module, and the backup module.

12. The system of claim 11, wherein the determination module determines the security characteristic of the backup server by identifying a security characteristic of at least one of:
a network the backup server uses to transfer backup data;
a data storage system of the backup server; and
settings of a security infrastructure of the backup server.

13. The system of claim 11, wherein:
the determination module identifies the security characteristic of the backup server by identifying an initial security characteristic that indicates the backup server meets an initial trust level that is appropriate for a sensitivity level of a type of backup task the backup server will likely perform; and
the deployment module deploys the signed certificate on the backup server by deploying an initial signed certificate that facilitates transferring backup data with a security level that corresponds to the initial trust level.

14. The system of claim 13, wherein:
the backup module further determines that the security level which with the initial signed certificate facilitates transferring backup data is not appropriate for the sensitivity level of the backup task assigned to the backup server;
the determination module further identifies an additional security characteristic of the backup server that indicates the backup server meets an additional trust level that is appropriate for the sensitivity level of the backup task, the additional trust level being higher than the initial trust level; and
the deployment module further deploys an additional signed certificate on the backup server that facilitates transferring backup data with a security level corresponding to the additional trust level.

15. The system of claim 11, wherein:
the deployment module further deploys the signed certificate on the backup server by storing, within the signed certificate, the security characteristic of the backup server; and
the backup client facilitates the secure backup operations by authenticating the backup server based on the security characteristic within the signed certificate.

16. The system of claim 11, wherein the plurality of types of signed certificates comprises at least one of:
signed certificates manually deployed by an administrator of the plurality of backup servers;
signed certificates deployed using an authorization token;
signed certificates deployed using a challenge-response protocol; and
self-signed certificates that are not signed by a certificate authority.

17. The system of claim 11, wherein the backup module further identifies the sensitivity level of the backup task by identifying at least one of:
a type of backup operation involved in the backup task;
a desired level of confidentiality of data involved in the backup task; and
a security characteristic of the backup client.

18. A non-transitory computer-readable medium comprising one or more computer-executable instructions that, when executed by at least one processor of a computing device, cause the computing device to:
identify a plurality of backup servers with heterogeneous computing environments that provide backup services for at least one backup client;
determine, for each of the plurality of backup servers, a trust level of the backup server by identifying at least one security characteristic of the backup server;
for each of the plurality of backup servers, select, within a plurality of types of signed certificates that provide various security levels for transferring backup data, a type of signed certificate for the backup server, wherein:
types of signed certificates that provide high security levels for transferring backup data are appropriate for backup servers with high trust levels; and
types of signed certificates that provide low security levels for transferring backup data are appropriate for backup servers with low trust levels;
deploy, on each of the plurality of backup servers, a signed certificate of the appropriate type selected for the backup server such that the backup server is capable of transferring backup data with a security level that corresponds to the trust level of the backup server; and
perform secure backup operations for the backup client by:
identifying a backup task to be performed;
identifying a sensitivity level of the backup task based at least in part on a type of data involved in the backup task; and assigning the backup task to at least one backup server within the plurality of backup servers that has a signed certificate that facilitates transferring backup data with a security level appropriate for the sensitivity level of the backup task.

* * * * *